United States Patent Office 2,740,748
Patented Apr. 3, 1956

2,740,748

OXIDATION OF MERCAPTANS WITH AN ALKALI METAL SALT OF SELENIUM CATALYST AND OXYGEN

Garbis H. Meguerian, Park Forest, Ill., assignor to Standard Oil Company, Chicago, Ill., a corporation of Indiana No Drawing. Application April 26, 1954,
Serial No. 425,709

18 Claims. (Cl. 196—29)

This invention relates to the conversion of mercaptans to disulfides. Also, the invention relates to the sweetening of sour hydrocarbon oils.

An object of the invention is the conversion of mercaptans to the corresponding disulfides by catalytic oxidation. Another object is to provide a superior catalyst for the oxidation of mercaptans which are dissolved in aqueous media. A particular object is a process for the sweetening of sour hydrocarbon oils. Another particular object is the regeneration of mercaptan containing aqueous media wherein the mercaptans have been obtained by treating a sour hydrocarbon oil with an aqueous medium. Other objects will become apparent in the course of the detailed description of the invention.

The process of this invention converts mercaptans to the corresponding disulfides by dissolving the mercaptan in an aqueous medium and contacting the solution with free-oxygen. The aqueous medium contains a catalytic amount of at least one alkali metal salt of an acid selected from the class consisting of selenous acid and selenic acid. The disulfides are recovered by physical separation from the aqueous phase.

The process is used to sweeten sour hydrocarbon oils by contacting the sour oil with an aqueous medium containing a catalytic amount of the defined selenium salt in the presence of at least sufficient free-oxygen to convert substantially all the mercaptans contained in the sour oil to disulfides; the contacting is carried on for a time at least sufficient to substantially sweeten the sour oil. The sweet oil is then separated from the aqueous medium.

The process can also be applied to the sweetening of a sour hydrocarbon oil by dissolving the mercaptans from the oil with an aqueous medium and then regenerating the aqueous medium by contacting it with sufficient free-oxygen, in the presence of a catalytic amount of the defined selenium salt. The mercaptans are converted to disulfides and separated from the regenerated aqueous medium, which medium is then recycled to the mercaptan removal zone.

The catalyst of this invention is an alkali metal salt of selenous acid or selenic acid. Examples of the catalyst are sodium biselenite, sodium selenite, sodium biselenate and sodium selenate. It is to be understood that mixtures of the various alkali metal salts of these acids may be utilized. Instead of utilizing the alkali metal salts directly, it is possible to prepare the salt in situ by dissolving the acid into aqueous medium containing alkali metal hydroxide. The selenite compounds may be prepared by adding selenium dioxide to aqueous medium containing alkali metal hydroxide.

The catalyst must be used in at least a sufficient quantity to promote the oxidation of mercaptan to disulfide. Generally, between about 0.01 and 2 weight percent of catalyst are utilized; the amount of catalyst is based on aqueous medium. More usually the amount of catalyst used will be between about 0.1 and 0.3 weight percent.

The catalyst is not susceptible to oxidation and therefore the conversion of mercaptan can be carried out completely. That is, there is no need to leave a definite amount of mercaptan in the catalyst containing aqueous medium in order to avoid loss of catalyst by oxidation.

The mercaptans which are susceptible to the process of this invention are the aliphatic mercaptans, cycloaliphatic mercaptans and aromatic mercaptans. More particularly, the mercaptans are those ordinarily found in sour hydrocarbon oils, particularly those found in sour petroleum distillates boiling below about 650° F.

Any sour hydrocarbon oil which is liquid at the temperatures of operation may be treated by this process. The sour petroleum distillates boiling below about 650° F. are particularly suitable, for example, naphthas, kerosene, diesel oil, heater oil. In general, the naphthas are less refractory than are those distillates boiling in the heavier-than-gasoline range, i. e., boiling between about 350° and 650° F. The sour petroleum distillates may be derived by distillation from crude or other virgin distillates. Or, they may be derived from various conversion processes, for example, thermal cracking, catalytic cracking, delayed coking, fluid coking, and acid treating.

The selenium compounds are somewhat sensitive to temperature. Therefore, in general, the process should be carried out at temperatures below about 200° F. Temperature has a considerable bearing on the rate of sweetening. The process can be utilized at moderate atmospheric temperatures, e. g., 60° F. if suitably long contact times are utilized. It is preferred to operate at a temperature between about 80° and 120° F.

It is to be understood that the contacting must be continued for a time at least sufficient to permit the conversion to proceed to the extent desired. This is normally to substantial completion of the mercaptan conversion; substantial completion is understood to be, in the case of sweetening an oil, the production of an oil that is substantially sweet to the doctor test. The time necessary to attain this will vary with the temperature, the amount of catalyst, the type of mercaptan, and the degree of agitation.

Free-oxygen is utilized as the oxidizing agent in this process. Sufficient free-oxygen must be present in the contacting zone to produce the desired degree of mercaptan conversion. Normally, at least enough free-oxygen is provided to convert theoretically all of the mercaptan to the corresponding disulfide. More than this amount is frequently utilized, for example, 150 to 250% of the theoretical requirement. The free-oxygen may be commercial grade of oxygen or air.

The process is carried out by utilizing an aqueous medium to dissolve the mercaptan. The aqueous medium may be any water containing medium which will dissolve mercaptan. The aqueous medium may produce a physical solution of mercaptan therein, for example, an aqueous alcohol solution, aqueous methanol or ethanol. Or, the aqueous medium may operate by reacting the mercaptan to form a water soluble salt, for example, aqueous caustic solutions wherein the mercaptan exists in the form of the corresponding alkali metal mercaptide; aqueous caustic-alcohol solutions wherein the mercaptans may exist both in the mercaptide form and in simple solution. The aqueous medium may comprise water and a solubilizer for mercaptans. Generally, the solubilizer is utilized with aqueous caustic solutions or aqueous caustic-alcohol solutions. Examples of such solubilizers are cresols, xylenols, water soluble fatty acid salts, and naphthenic acid salts.

The invention may be utilized to prepare pure disulfides by conversion of the corresponding pure mercaptan. To illustrate: methyl mercaptan may be dissolved in a sodium hydroxide-water solution containing about 15% of the sodium hydroxide. The sodium hydroxide solution may contain between about 0.01 and 2 weight per cent of the alkali metal salt of selenous acid or selenic acid, for example, 0.2 weight per cent of sodium selenite. The solution of aqueous caustic, selenite and mercaptide may then be contacted with pure oxygen at a temperature of about 100° F. for a time sufficient to convert essentially all the mercaptan to methyl disulfide. The methyl disulfide is insoluble in the aqueous caustic solution and is separated therefrom by decantation. The aqueous caustic-selenite solution is ready for reuse in dissolving methyl mercaptan.

The use of the process for the sweetening of sour hydrocarbon oil: A sour catalytically cracked naphtha having a mercaptan number of about 10 mg. per 100 ml. of naphtha may be contacted with sufficient aqueous caustic-catalyst solution to form a separate aqueous phase, for example, about 10 volume per cent of aqueous medium based on sour naphtha. The sour naphtha and aqueous medium are intimately contacted in the presence of at least sufficient free-oxygen to convert substantially all the mercaptan in the naphtha to disulfide, for example, about 200% of the theoretical requirement to convert mercaptan to disulfide. The contacting is carried out at a temperature of about 100° F. for a time sufficient to substantially sweeten said naphtha. At the end of this time, the naphtha and aqueous phase are permitted to settle and the substantially sweet naphtha is separated from the aqueous medium which may be utilized to sweeten additional quantities of sour naphtha.

Another mode of utilizing this invention: Sour hydrocarbon oil is contacted with an aqueous medium under conditions to dissolve substantially all of the mercaptan from the oil into the aqueous medium. For example, sour diesel oil is contacted with about 100 volume per cent of aqueous caustic-methanol solution containing xylenols as mercaptan solubilizers. This contacting is carried out in the absence of free-oxygen in order to avoid formation of oil soluble disulfides. The substantially sweet oil is separated from the aqueous phase comprising aqueous medium and mercaptans. The aqueous medium may be regenerated by contacting the aqueous phase with free-oxygen in an amount at least sufficient to convert all of mercaptans, at a temperature between about 80 and 120° F. and in the presence of between about 0.1 and 0.3 weight per cent of sodium selenate. The disulfides are separated by decantation from the regenerated aqueous medium, which medium is then recycled to the mercaptan removal zone for treatment of additional quantities of sour oil.

The results obtainable with the process of this invention are illustrated by the following examples. It is to be understood that these examples do not limit the scope of the invention. In the examples, the oxidation of mercaptan was carried out as follows: A measured amount of aqueous medium and hexyl mercaptan was added to a 50 ml. round-bottomed flask. A few glass beads were added to the flask to aid in agitation. The flask was clamped to a shaker arm in such a way that the contents were surrounded by the liquid in a constant temperature bath. Cylinder oxygen was introduced into the top of the flask at a rate controlled to maintain a constant pressure in the flask. The rate of oxygen absorption was measured. Since the oxygen was not bubbled through the liquid, the flask was vibrated 100 times per minute to provide agitation of the flask and improve the oxygen-liquid contacting.

*Example I*

In this example, hexyl mercaptan was dissolved in aqueous ethanol. The aqueous ethanol contained 85 volume per cent of ethanol. The flask was maintained at an oxygen pressure of 80 p. s. i. g. and the temperature was 75° F. The 85% aqueous ethanol was used as the aqueous medium because hexyl mercaptan is very soluble therein, but hexyl disulfide is insoluble therein.

*Test 1.*—In this test, no catalyst was present in the aqueous medium. The test was continued for three hours at 75° F. without appreciable absorption of oxygen. Then the temperature of the bath was raised to 212° F. and the contacting continued for two hours. Still no appreciable amount of disulfide was formed.

*Test 2.*—Sodium biselenite was added to the aqueous medium in an amount of 0.15 weight per cent. At the end of three hours of contacting at 75° F. the hexyl mercaptan had been converted to the extent of 83%.

*Example II*

In this example the aqueous medium consisted of 10 ml. of 85% aqueous ethanol and 3.5 ml. of one molar aqueous sodium hydroxide. In this aqueous medium 0.5 ml. of hexyl mercaptan was dissolved. The flask was maintained at an oxygen pressure of 1 atm. and at a constant temperature of 85° F.

*Test 3.*—In this test only 0.5 ml. of oxygen was absorbed after 75 minutes of contacting.

*Test 4.*—In this test, 1 ml. of an 0.1 molar sodium biselenite solution was added to the aqueous medium. This provided an amount of catalyst corresponding to 0.15 weight per cent of the total aqueous medium. In this test, the rate of oxygen absorption was followed for 75 minutes. The rate of oxygen absorption was:

| Minutes: | Ml. $O_2$ absorbed |
|---|---|
| 10 | 1.2 |
| 25 | 2.6 |
| 40 | 3.4 |
| 75 | 6.4 |

*Example III*

In this example, the ability of the catalyst containing aqueous medium to be reused was examined. The aqueous medium consisted of 85% aqueous ethanol (100 ml.) containing 0.15 weight per cent of sodium biselenite. The fat solution was made up by adding 5 grams of hexyl mercaptan to the aqueous ethanol. In this example, the contacting was at 75° F. and no oxygen was added to the flask after the initial introduction. In each test, the oxygen pressure at the start was 88 p. s. i. g.

*Test 5.*—In this test, the fresh catalyst containing aqueous medium and mercaptan were contacted until a constant pressure of 60 p. s. i. g. was attained in the flask. At the end of three hours, the contents of the flask were removed and the disulfide decanted from the aqueous phase. All of the mercaptan had been converted to disulfide.

*Test 6.*—The regenerated aqueous medium of Test 5 was used to dissolve 5 grams of hexyl mercaptan. The fat solution was placed in the flask and the flask pressured with oxygen to 88 p. s. i. g. After three hours of contacting, the pressure had dropped to 70 p. s. i. g. The contacting was continued until a constant pressure of 60 p. s. i. g. was attained for a total contacting time of nine hours. The disulfide was decanted from the aqueous phase. In this test all of the hexyl mercaptan had been converted to the disulfide. It is thought that the increased contacting time necessary in this test was due to the loss of catalyst in the aqueous phase along with the disulfide in the decantation operation. These tests indicate that this catalyst is not destroyed by oxidation even when all of the mercaptan has been converted to disulfide.

It has been found that, when using aqueous caustic containing media, metallic selenium in the form of fine particles is an effective oxidation catalyst for the conversion of mercaptans to disulfides.

Thus having described the invention what is claimed is:

1. A process of converting mercaptans to the corresponding disulfides, which process comprises dissolving a mercaptain in an aqueous medium, which medium contains a catalytic amount of an alkali metal salt of an acid selected from the class consisting of selenous and selenic, contacting said solution with free-oxygen and separating disulfides formed by the oxidation of mercaptan from an aqueous phase.

2. The process of claim 1 wherein said contacting is carried out at a temperature of between about 60° and 200° F.

3. The process of claim 1 wherein said salt is sodium biselenite.

4. The process of claim 1 wherein said salt is sodium selenate.

5. The process of claim 1 wherein said aqueous medium comprises a solution of alkali metal hydroxide and water.

6. The process of claim 1 wherein said aqueous medium comprises a solution of aqueous caustic and alcohol.

7. The process of claim 1 wherein said aqueous medium comprises an aqueous alcohol solution.

8. The process of claim 1 wherein said catalyst is present in an amount between about 0.01 and 2 weight percent based on aqueous medium.

9. A process of sweetening a sour hydrocarbon oil, which process comprises contacting said oil with an amount of an aqueous medium sufficient to form a separate aqueous phase, which medium contains between about 0.01 and 2 weight percent of a catalyst selected from the class consisting of the alkali metal salts of selenous acid and selenic acid, in the presence of at least sufficient free-oxygen to convert substantially all of the mercaptans contained in said oil to disulfides, at a temperature between about 60° and 200° F., for a time at least sufficient to substantially sweeten said oil and separating a substantially sweet oil from an aqueous phase.

10. The process of claim 9 wherein said catalyst is present in an amount between about 0.1 and 0.3 weight percent.

11. The process of claim 9 wherein said contacting is carried out at a temperature between about 80° and 120° F.

12. The process of claim 9 wherein said sour oil is a petroleum fraction boiling in the naphtha range.

13. The process of claim 9 wherein said sour oil is a petroleum fraction boiling within the range of about 350° and 650° F.

14. The process of sweetening a sour petroleum oil, which process comprises (1) contacting said oil with an aqueous medium under conditions to dissolve substantially all of the mercaptans from said oil, (2) separating a substantially sweet oil from an aqueous phase comprising aqueous medium and mercaptans, (3) contacting said aqueous phase, in the presence of a catalytic amount of an alkali metal salt of an acid selected from the class consisting of selenous and selenic, with an amount of free-oxygen at least sufficient to convert essentially all of said mercaptans to disulfides, at a temperature between about 60° and 200° F., for a time sufficient to convert essentially all of said mercaptans to disulfides, (4) separating disulfides from an aqueous phase which is essentially free of mercaptans and (5) recycling said regenerated aqueous phase to the contacting zone of step (1).

15. The process of claim 14 wherein said aqueous medium comprises a solution of alkali metal hydroxide, water and a solubilizer for mercaptans.

16. The process of claim 14 wherein said aqueous medium comprises substantially aqueous caustic and methanol.

17. The process of claim 14 wherein said catalyst is present in an amount between about 0.1 and 0.3 weight percent.

18. The process of claim 17 wherein said catalyst is sodium biselenite.

References Cited in the file of this patent

FOREIGN PATENTS 10,040 of 1913     Great Britain _____ Apr. 16, 1914